3,155,572
COMPOSITIONS AND METHODS FOR
TREATING COCCIDIOSIS
Edward F. Rogers, Middletown, and Lewis H. Sarett, Princeton, N.J., assignors to Merck & Co., Inc., Rahway, N.J., a corporation of New Jersey
No Drawing. Filed Apr. 13, 1959, Ser. No. 805,738
9 Claims. (Cl. 167—53.1)

This invention relates generally to methods for the treatment of coccidiosis. More specifically, it is concerned with chemical compounds which are useful in the prevention and the cure of that disease. Still more specifically, it is concerned with quinolinium and isoquinolium quaternary salts which are effective in controlling coccidiosis when fed in small amounts to poultry. It is further concerned with novel compositions containing such substances.

Coccidiosis is a common and widespread poultry disease caused by several species of protozoan parasites of the genus Eimeria, such as *E. tenella*, *E. necatrix*, *E. acervulina*, *E. maxima*, *E. hagani* and *E. brunetti*. *E. tenella* is the causative agent of a severe and often fatal infection of the ceca of chickens which is manifested by extensive hemorrhage, accumulation of blood in the ceca, and the passage of blood in the droppings. *E. necatrix* as well as other species attack the small intestine of the chick causing what is known as intestinal coccidiosis. Related species of coccidia such as *E. melagridis* and *E. adenoides* are causative organisms of coccidiosis in turkeys. When left untreated, the severe forms of coccidiosis lead to poor weight gain, reduced feed efficiency and high mortality in fowl. The elimination or control of coccidiosis is, therefore, of paramount importance to the poultry raising industry.

It has now been found that certain quinolinium and isoquinolinium compounds are highly active against the protozoa responsible for coccidiosis. One object of the invention is to provide such compounds. Another object is to provide novel compositions containing such substances as an active ingredient. A further object is the provision of animal feeds and feed supplements containing these quaternary salts. Other objects will be apparent from the following discussion:

According to this invention it has been found that 1-(2-loweralkyl-4-amino-5-pyrimidylmethyl) quinolinium and isoquinolinium quaternary salts, and particularly those compounds wherein the quinolinium ring is substituted with 1 or 2 lower alkyl groups, are very effective in preventing and treating coccidiosis. The preferred compounds of our invention are quaternary salts of the formulae—

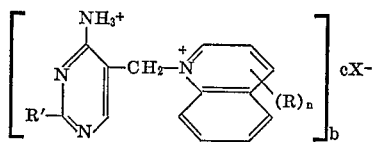

I

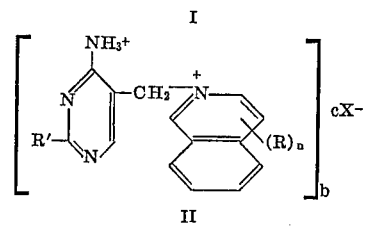

II wherein R and R' are lower alkyl radicals, n has a value of 1 or 2, X is an anion, and b and c are positive numbers having values such that the positive charge of b moles of cation is neutralized by c moles of anion X. Thus when X is a monovalent anion such as a halide, b is 1 and c is 2. When more than one lower alkyl group is present in the quinoline ring, i.e., when n is 2 or 3, such lower alkyl groups may be the same or different.

As described more fully below, these anticoccidial compounds are prepared by reaction of a 2-lower-alkyl-4-amino-5-substitutedmethyl pyrimidine with an appropriately alkylated quinoline or isoquinoline. It will be apparent from the above structural formulae that the anticoccidial compounds described herein may be considered as substituted quinolines or isoquinolines with such heterocyclic nucleus substituted at the 1-position by a 2-loweralkyl-4-amino-5-pyrimidylmethyl radical; in the preferred compounds, it is further substituted with one or two lower alkyl groups, such as methyl, ethyl, propyl, isopropyl, butyl and amyl groups, although the quaternaries wherein the quinoline or isoquinoline ring is unsubstituted are within the purview of this invention. As examples of quinoline and isoquinoline compounds that may be quaternized with a 2-loweralkyl-4-amino-5-substitutedmethyl pyrimidine to give highly active coccidiostat compounds there may be mentioned 2-methyl quinoline, 4-methyl quinoline, 6-methyl quinoline, 6-propyl quinoline, 3-methyl isoquinoline, 1,4-dimethyl isoquinoline, quinoline, isoquinoline and the like.

The loweralkyl group present in the 2-position of the 4-amino-5-substitutedmethyl pyrimidine may be one such as a methyl, ethyl, propyl, isopropyl, butyl or amyl group. The lower alkyl groups present in these quaternary salts need not, of course, be the same in any particular compound.

The quaternary anion of our anticoccidial substances may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, embonic, abietic, 2-naphthalene sulfonic or ethylenediamine tetracetic acids. It may also be the anion of a polymer such as a polyphosphate of polystyrenesulfonate ion. The nature of the anion is not critical and any anion may be employed as long as it is not unduly toxic for the poultry. It will be realized that an acid addition salt of the primary amine group present in these compounds will also be formed concurrently with the quaternary salt.

These substances are conveniently fed to poultry as a component of the feed of the animals although they may also be given dissolved or suspended in the drinking water. According to one aspect of the invention, novel compositions are provided in which a quinolinium or isoquinolinium quaternary salt is present as an active anticoccidial ingredient. Such compositions comprise the quaternary salts intimately dispersed in or admixed with an inert carrier or diluent. By an inert carrier is meant one that is nonreactive with respect to the quaternary and that may be administered with safety to the animals. The carrier or diluent is preferably one that is or may be an ingredient of the animal feed.

The compositions which are a preferred feature of the invention are the so-called feed supplements in which the active ingredient is present in relatively large amounts and which are suitably for addition to the poultry feed directly or after an intermediate dilution or blending step. Examples of carriers or diluents suitable for such compositions are solid orally ingestable carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The quaternary salts are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient are particularly suitable for addition to poultry feedstuffs, and compositions containing from about 5–15% by weight of coccidiostat are very satisfactory. The active compound is normally dispersed or mixed uniformly in the diluent but in some instances may be sorbed on the carrier. The optimal concentration of coccidiostat in these feed supplements will depend to some extend on the particular compound employed. Since it is convenient for the feed manufacturer to use about one pound of feed supplement for each ton of finished feed, the preferred concentration of any one of our coccidiostats in a feed supplement is partly a function of the level of active ingredient desired in the finished feed.

Typical feed supplements containing quaternary salts representative of our invention dispersed in an inert carrier include

|   | Lbs. |
|---|---|
| A. 1-(2-ethyl-4-amino-5-pyrimidylmethyl)-4-methyl quinolinium chloride hydrochloride | 6.0 |
| Wheat standard middlings | 94.0 |
| B. 1-(2 - methyl - 4 - amino-5-pyrimidylmethyl)-isoquinolinium bromide hydrobromide | 10.0 |
| Corn distillers' dried grains | 90.0 |
| C. 1 - (2 - methyl - 4 - amino-5-pyrimidylmethyl)-4-methyl quinolinium bromide hydrobromide | 15.0 |
| Wheat standard middlings | 85.0 |
| D. 1 - (2 - n - propyl-4-amino-5-pyrimidylmethyl)-4-methyl quinolinium dipicrate | 12.0 |
| Molasses solubles | 88.0 |
| E. 1-(2-methyl-4-amino-5-pyrimidylmethyl) quinolinium bromide hydrobromide | 20.0 |
| Corn germ meal | 30.0 |
| Corn distillers' grains | 50.0 |
| F. 1 - (2 - methyl - 4 - amino-5-pyrimidylmethyl)-6-methyl quinolinium chloride hydrochloride | 40.0 |
| Soya grits | 60.0 |
| G. 1-(2-ethyl-4-amino-5-pyrimidylmethyl)-2-methyl quinolinium sulfate | 5.0 |
| Fermentation residues | 50.0 |
| Wheat shorts | 45.0 |

These and similar feed supplements are prepared by uniformly mixing the quaternary salt with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of quinolinium or isoquinolinium quaternary salt required for control of coccidiosis in poultry will, of course, vary somewhat with the specific compound employed. The compounds of the invention are effective in preventing the disease when administered at levels of less than about 0.05% by weight of the feed. Generally, good prophylactic results are obtained when the quaternary is fed in amounts of from about 0.0005% to about 0.05% by weight of the total feed consumed; for best results it is preferred that the poultry feed contain between about 0.0025% and 0.025% by weight of quaternary salt. When the quinolinium or isoquinolinium salts are to be employed as therapeutic agents, the higher levels are used for relatively short periods of time. Thus, concentration of about 0.02% to 0.05% by weight of the feed may be advantageously administered in treating an established outbreak of coccidiosis. It will be realized that the optimum dose level will vary slightly with the particular compound being employed.

Many of these quinolinium quaternary salts are advantageously administered by way of the drinking water of the birds. This method of treatment is often employed in the therapeutic use of our compounds since poultry infected with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and prepartions containing from 1–25% by weight of quaternary compound are suitable in reacting our invention.

The compounds described herein are synthesized by reacting an appropriately substituted pyrimidine and a quinoline or isoquinoline compound. According to one process, a 2-loweralkyl-4-amino-5-halomethyl pyrimidine dihydrohalide, in which the halogen is bromine or chlorine, is reacted directly with the quinoline or isoquinoline. We prefer to employ organic solvents inert under the reaction conditions such as lower alkanols, acetonitrile or an N,N-diloweralkyl alkanamide as the reaction medium. The temperature is not critical and it is convenient to carry out the process at about room temperature. After a short time the quaternary salt crystallizes and is recovered by known techniques such as filtration or centrifugation.

Although the 5-halomethyl pyrimidines are generally most conveniently employed for the quaternization, we may also employ an ester of 2-loweralkyl-4-amino-5-hydroxymethyl pyrimidine. Suitable esters are the methylsulfite, p-toluenesulfonate and nitrate esters. The quaternization may be conducted so that the particular salt desired for treating coccidiosis is obtained directly. Alternatively, the quaternary salt recovered from the synthetic reaction medium may be conveniently metathesized to another salt by techniques known in the art.

The following examples are given for purposes of illustration and not by way of limitation:

*Example 1*

(a) Forty ml. of 4-methyl quinoline was added to a suspension of 20 grams of 2-ethyl-4-amino-5-bromomethylpyrimidine dihydrobromide in 100 ml. of acetonitrile at room temperature. The mixture became warm and a clear solution formed. In a few minutes 1-(2-ethyl-4-amino-5-pyrimidylmethyl)-4-methyl quinolinium bromide hydrobromide began to crystallize. The mixture was allowed to stand at room temperature overnight. The quaternary salt was then recovered by filtration. On recrystallization from aqueous acetone the product melted at 264° C. (dec.).

(b) When the above procedure was repeated using isoquinoline in place of 4-methyl quinoline there was obtained 1-(2-ethyl-4-amino-5-pyrimidylmethyl)-isoquinolinium bromide hydrobromide which on recrystallization from aqueous ethanol melted at 288° C. (dec.).

*Example 2*

(a) To a suspension of 30 grams of 2-methyl-4-amino-5-bromomethylpyrimidine dihydrobromide in 125 ml. of acetonitrile was added at room temperature 25 grams of 3 - methylisoquinoline. In a short time 1-(2-methyl-4-amino-5-pyrimidylmethyl)-3-methyl isoquinolinium bromide hydrobromide began to crystallize. The mixture was allowed to stand at room temperature for about 15 hours. The quaternary salt was filtered off and recrystallized from aqueous acetone. It had a melting point of 247° C. (dec.).

(b) When the method of Example 2(A) was repeated using 15 grams of 2-ethyl-4-amino-5-bromoethylpyrimidine dihydrobromide and 16 grams of 3-methyl isoquinoline as the reactants, there was obtained 1-(2-ethyl-4-amino-5-pyrimidylmethyl)-3-methyl isoquinolinium bromide hydrobromide, melting point 253° C. (dec.).

*Example 3*

(a) The procedure of Example 1(a) was repeated using as the reactants 15 grams of 2-ethyl-4-amino-5-bromomethylpyrimidine dihydrobromide and 25 ml. of 6-methyl quinoline. There was produced 1-(2-ethyl-4-amino-6-pyrimidylmethyl)-6-methylquinolinium bromide hydrobromide. After recrystallization from aqueous acetone the quaternary salt had a melting point of 283° C. (dec.).

(b) When the method of Example 1(a) was carried out using 15 grams of 2-ethyl-4-amino-5-bromoethyl-pyrimidine dihydrobromide and 20 ml. of 7-methyl quinoline as the reagents, 1-(2-ethyl-4-amino-5-pyrimidylmethyl)-7-methyl quinolinium bromide hydrobromide was produced. The product melted at 229° C. (dec.) after recrystallization from aqueous acetone.

(c) When Example 3(b) was carried out using 2-methyl quinoline in place of 7-methyl quinoline, 1-(2-ethyl-4-amino-5-pyrimidylmethyl)-2-methyl quinolinium bromide hydrobromide, melting point 195° C. (dec.) was produced.

*Example 4*

(a) To 30 grams of 2-methyl-4-amino-5-bromomethyl-pyrimidine dihydrobromide in 80 ml. of methanol was added 90 ml. of 4-methyl quinoline. The mixture was allowed to stand at about room temperature for about 15 hours. At the end of this time the crystalline 1-(2-methyl-4-amino-5-pyrimidylmethyl)-4-methyl quinolinium bromide hydrobromide was recovered by filtration and recrystallized from aqueous ethanol. It had a melting point of 257° C. (dec.).

(b) Five grams of the above material was dissolved in 20 ml. of concentrated hydrochloric acid, and the resulting solution diluted carefully with 400 ml. of acetone. The crystalline material thus obtained was redissolved in 20 ml. of concentrated hydrochloric acid and the solution diluted with 400 ml. of fresh acetone. The resulting crystalline 1-(2-methyl-4-amino-5-pyrimidylmethyl)-4-methyl quinolinium chloride hydrochloride was filtered and dried. It melted at 253° C. (dec.).

*Example 5*

(a) 75 ml. of 2-methyl quinoline and 25 grams of 2-methyl-4-amino-5-bromomethylpyrimidine dihydrobromide were reacted together in 75 ml. of methanol. 1-(2-methyl-4-amino-5-pyrimidylmethyl)-2-methyl quinolinium bromide hydrobromide crystallized. On recrystallization from aqueous ethanol and drying, it melted at 243° C. (dec.).

(b) Reaction of 20 grams of 2-methyl-4-amino-5-bromomethylpyrimidine dihydrobromide and 20 ml. of 6-methyl quinoline under the conditions of Example 5(a) gave 1-(2-methyl-4-amino-5-pyrimidylmethyl)-6-methyl quinolinium bromide hydrobromide, melting point 293° C. (dec.).

(c) When the procedure of Example 5(a) was repeated in 100 ml. of methanol using 50 ml. of 7-methyl quinoline in place of 2-methyl quinoline, there was produced 1-(2-methyl-4-amino-5-pyrimidylmethyl)-7-methyl quinolinium bromide hydrobromide, melting point 241° C. (dec.).

*Example 6*

(a) To a solution of 30 grams of 2-methyl-4-amino-5-bromomethylpyrimidine dihydrobromide in 500 ml. of ethanol at room temperature was added 70 ml. of isoquinoline. The mixture was allowed to stand overnight at about room temperature. The resulting crystalline 1-(2-methyl-4-amino-5-pyrimidylmethyl)-isoquinolinium bromide hydrobromide was recovered by filtration and dried. It melted at 256° C. (dec.).

(b) 160 ml. of quinoline was added to a solution of 90 grams of 2-methyl-4-amino-5-bromomethylpyrimidine dihydrobromide in 500 ml. of ethanol. After a short time crystals of 1-(2-methyl-4-amino-5-pyrimidylmethyl) quinolinium bromide hydrobromide appeared. These were recovered by filtration and treated as in Example 4(b) to form the chloride hydrochloride, melting point 271° C. (dec.).

*Example 7*

The anticoccidial activity of the compounds of this invention is determined by the following method:

Straight run White Leghorn chicks, in groups of three each, were weighed and placed in cages with wire floors. They were fed ad libitum a standard laboratory basal ration in which graded levels of the quaternary salt were intimately dispersed or blended. Normal and infected control birds were fed basal ration containing no quaternary salt. One the second day of test, the chicks were each orally inoculated with 50,000 sporulated oocysts of *Eimeria tenella*. Papers under the cages were examined on the sixth, seventh and eighth days of assay for the presence or absence of bloody droppings. A score of 0 was given if no bloody droppings were observed; scores of 1, 2 or 4 were assigned for 1–3, 4–6 and >6 bloody spots, respectively. On the eighth day of assay, the surviving birds were weighed, sacrificed and examined grossly for cecal coccidiosis lesions. Normal ceca were scored 0, and ceca with detectable, moderate or maximal lesions were scored 1, 2 and 4, respectively. When a bird died and cecal coccidiosis lesions were present, a score of 5 was recorded. If the total of the two scores was 0–5, the compound under test was rated "active"; if the total score was 6 or more the compound was rated "inactive" at the concentration tested.

The following compounds were active at the dose level indicated.

| Compound: | Percent in feed |
|---|---|
| 1-(2-methyl-4-amino-5-pyrimidylmethyl) quinolinium bromide hydrobromide | 0.025 |
| 1-(2-methyl-4-amino-5-pyrimidylmethyl)-6-methyl quinolinium bromide hydrobromide | 0.025 |
| 1-(2-methyl-4-amino-5-pyrimidylmethyl)-7-methyl quinolinium bromide hydrobromide | 0.05 |
| 1-(2-methyl-4-amino-5-pyrimidylmethyl)-2-methyl quinolinium bromide hydrobromide | 0.0125 |
| 1-(2-methyl-4-amino-5-pyrimidylmethyl)-4-methyl quinolinium bromide hydrobromide | 0.0125 |
| 1-(2-ethyl-4-amino-5-pyrimidylmethyl)-6-methyl quinolinium bromide hydrobromide | 0.0125 |
| 1-(2-ethyl-4-amino-5-pyrimidylmethyl)-7-methyl quinolinium bromide hydrobromide | 0.006 |
| 1-(2-ethyl-4-amino-5-pyrimidylmethyl)-4-methyl quinolinium bromide hydrobromide | 0.002 |
| 1-(2-ethyl-4-amino-5-pyrimidylmethyl)-isoquinolinium bromide hydrobromide | 0.025 |
| 1-(2-ethyl-4-amino-5-pyrimidylmethyl)-3-methyl isoquinolinium bromide hydrobromide | 0.006 |
| 1-(2-methyl-4-amino-5-pyrimidylmethyl)-3-methyl isoquinolinium bromide hydrobromide | 0.002 |
| 1-(2-methyl-4-amino-5-pyrimidylmethyl) isoquinolinium bromide hydrobromide | 0.025 |

Example 8

The 2-loweralkyl-4-amino-5-halomethyl pyrimidines employed in making the quaternary compounds of this invention are prepared in the following manner:

(a) *2-loweralkyl-4-amino-5-cyanopyrimidine.*—A slurry of 54.7 grams of butyramidine hydrochloride and 55 ml. of absolute ethanol is treated at about 5° C. with a solution of 11 grams of sodium in 220 ml. of absolute ethanol. The resulting solution is added with stirring at 10–12° C. over a 30 minute period to 53.7 grams of ethoxymethylenemalononitrile in 54 ml. of absolute ethanol. The resulting mixture is stirred at 0° C. for six hours and then at room temperature for about 12 hours. The mixture is then filtered, evaporated to dryness in vacuo and the residue treated with water. The alcoholic and aqueous solution precipitates are combined, washed with water and dried in air. The product is recrystallized from alcohol to give 2-n-propyl-4-amino-5-cyanopyrimidine, melting point 158–160° C.

When the above reaction is carried out with isobutyramidine there is obtained 2-isopropyl-4-amino-5-cyanopyrimidine, melting point 150–151° C. When amylamidine is employed as starting material the end product is 2-butyl-4-amino-5-cyanopyrimidine, melting point 143–147° C. When hexylamidine is utilized as starting compound, there is obtained 2-amyl-4-amino-5-cyanopyrimidine, melting point 149–150° C.

(b) *2-loweralkyl-4-amino-5-aminomethylpyrimidine dihydrochloride.*—16.2 grams of 2-n-propyl-4-amino-5-cyanopyrimidine is reduced at about 40 lbs. pressure in 200 ml. of methanol in the presence of 26 grams of ammonia and one tablespoon of Raney nickel. The drop in pressure is about 36.5 lbs. The reaction mixture on completion of the reduction is concentrated to a syrup after filtering off the catalyst. The residue thus obtained is acidified with dilute hydrochloric acid and concentrated to a crystalline mass. On recrystallization from methanol-acetone there is obtained 2-n-propyl-4-amino-5-aminomethylpyrimidine dihydrochloride, melting point 220–222° C.

When the 2-isopropyl, 2-butyl and 2-amyl-4-amino-5-cyanopyrimidine obtained as described above are used as starting materials in this reduction, there are obtained respectively 2-isopropyl-4-amino-5-aminomethylpyrimidine dihydrochloride, melting point 257–260 C., 2-butyl-4-amino-5-aminomethylpyrimidine dihydrochloride, melting point 221–223° C., and 2-amyl-4-amino-5-aminomethylpyrimidine dihydrochloride, melting point 188–189° C.

(c) *2-loweralkyl-4-amino-5-hydroxy methyl pyrimidine.*—Twelve grams of 2-n-propyl-4-amino-5-aminomethylpyrimidine dihydrochloride in 50 ml. of water is treated at 50–60° C. with a solution of 3.5 grams of sodium nitrite in 30 ml. of water. The sodium nitrite is added dropwise over a 45-minute period. The heating is continued for an additional two hours, and the reaction mixture then made alkaline with sodium carbonate and extracted with butanol. The butanol extract is evaporated to dryness and the residue crystallized from acetone to give 2-n-propyl-4-amino-5-hydroxymethylpyrimidine, melting point 115–116° C.

When the 2-isopropyl, 2-butyl and 2-amyl-4-amino-5-aminomethylpyrimidine dihydrochlorides obtained as in Part b above is utilized in this reaction in place of the 2-n-propyl compound, there are obtained 2-isopropyl-4-amino-5-hydroxymethylpyrimidine, 2-butyl-4-amino-5-hydroxymethylpyrimidine and 2-amyl-4-amino-5-hydroxymethylpyrimidine.

(d) *2-loweralkyl-4-amino-5-bromo methyl pyrimidine.*—The 2-n-propyl-4-amino-5-hydroxymethylpyrimidine obtained in Part c above is dissolved in 15 ml. of acetic acid saturated with hydrogen bromide, and the mixture allowed to stand at room temperature for about 15 hours. 2-n-propyl-4-amino-5-bromomethylpyrimidine dihydrobromide crystallizes and is recovered by filtration and washed with ether. The material is substantially pure and may be used directly in preparing the quaternary salts of this invention.

The other 2-loweralkyl-4-amino-5-hydroxymethylpyrimidines described above are treated in like manner with hydrogen bromide to give 2-isopropyl-4-amino-5-bromomethylpyrimidine dihydrobromide, melting point 191–192° C., 2-butyl-4-amino-5-bromomethylpyrimidine dihydrobromide, melting point 145–150° C., and 2-amyl-4-amino-5-bromomethylpyrimidine dihydrobromide.

Any departure from the above description which conforms to the present invention is intended to be included within the scope of the claims.

What is claimed is:

1. A composition useful against coccidiosis that comprises a solid nutritive poultry feed additive having intimately dispersed therein a quaternary salt selected from the class consisting of a compound having the formula—

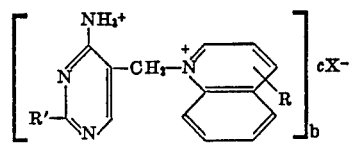

and compounds having the formula—

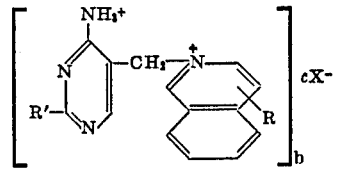

wherein R and R' are lower alkyl groups, X is a non-toxic anion, and b and c are positive numbers of such value that b moles of cation are neutralized by c moles of anion X.

2. A poultry feed supplement composition that comprises a solid nutritive poultry feed additive having dispersed therein from about 1% to about 40% by weight of an acid addition salt of a 1-(2-lower-alkyl-4-amino-5-pyrimidylmethyl)-quinolinium quaternary salt, wherein the anion of the salt is a non-toxic anion.

3. A poultry feed supplement composition that comprises a solid nutritive poultry feed additive having dispersed therein from about 1% to about 40% by weight of an acid addition salt of a 1-(2-lower-alkyl-4-amino-5-pyrimidylmethyl)-isoquinolinium quaternary salt, wherein the anion of the salt is a non-toxic anion.

4. A composition useful against coccidiosis that comprises a solid nutritive poultry feed additive having dispersed therein from about 1% to about 40% by weight of 1-(2-ethyl-4-amino-5-pyrimidylmethyl)-4-methyl quinolinium halide hydrohalide.

5. A composition useful against coccidiosis that comprises a solid nutritive poultry feed additive having dispersed therein from about 1% to about 40% by weight of 1-(2-methyl-4-amino-5-pyrimidylmethyl)-3-methyl isoquinolinium halide hydrohalide.

6. A poultry feed supplement composition that comprises a solid nutritive poultry feed additive having dispersed therein from about 1% to about 40% by weight of an acid salt of a 1-(2-loweralkyl-4-amino-5-pyrimidylmethyl)-quinolinium quaternary salt, wherein the quinoline ring is mono-lower alkylated and the anion of the salt is a non-toxic anion.

7. A poultry feed supplement composition that comprises a solid nutritive poultry feed additive having dispersed therein from about 1% to about 40% by weight of an acid salt of a 1-(2-loweralkyl-4-amino-5-pyrimidylmethyl)-isoquinolinium quaternary salt, wherein the isoquinoline ring is mono-lower alkylated and the anion of the salt is a non-toxic anion.

8. An animal feedstuff having dispersed therein from about 0.0005% to about 0.05% by weight of a quaternary salt selected from the class consisting of a compound having the formula—

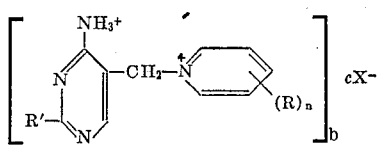

and compounds having the formula—

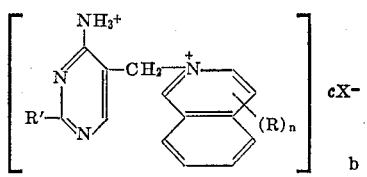

wherein R and R' are lower alkyl groups, X is a nontoxic anion, $n$ has a value of 0 to 2 inclusive, and $b$ and $c$ are positive numbers of such value that $b$ moles of cation are neutralized by $c$ moles of anion X.

9. The method of treating coccidiosis in poultry that comprises administering to poultry a feed having intimately dispersed therein from about 0.0005% to about 0.05% by weight of a quaternary salt selected from the class consisting of compounds having the formula—

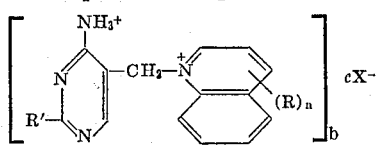

and compounds having the formula—

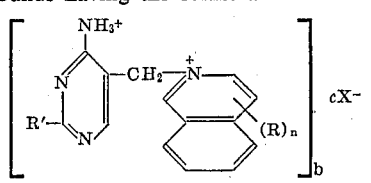

wherein R and R' are lower alkyl groups, X is a nontoxic anion, $n$ has a value of 0 to 2 inclusive, and $b$ and $c$ are positive numbers of such value that $b$ moles of cation are neutralized by $c$ moles of anion X.

References Cited in the file of this patent

Taizo: Chem. Abstracts, vol. 50, 1956, p. 1010G.
Chem. Abst. Subject Index, vol. 51, 1957, p. 2070S.

UNITED STATES PATENT OFFICE
CERTIFICATE OF CORRECTION

Patent No. 3,155,572　　　　　　　　　　　　November 3, 1964

Edward F. Rogers et al.

It is hereby certified that error appears in the above numbered patent requiring correction and that the said Letters Patent should read as corrected below.

Column 9, lines 3 to 9, the formula should appear as shown below instead of as in the patent:

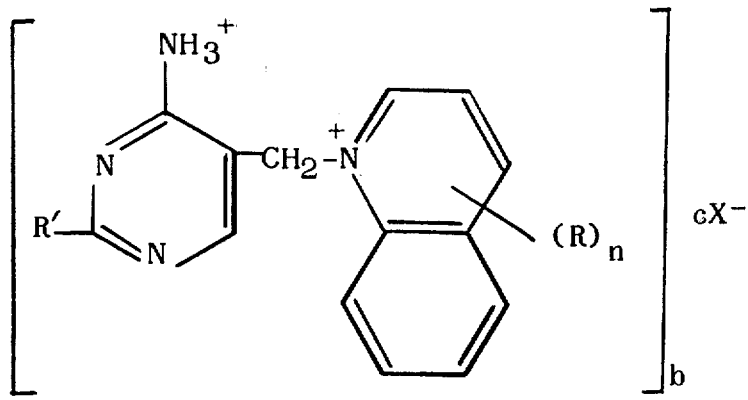

Signed and sealed this 16th day of March 1965.

(SEAL)
Attest:

ERNEST W. SWIDER　　　　　　　　　　　　EDWARD J. BRENNER
Attesting Officer　　　　　　　　　　　　Commissioner of Patents